US012593186B2

(12) United States Patent
Kulavik et al.

(10) Patent No.: US 12,593,186 B2
(45) Date of Patent: *Mar. 31, 2026

(54) AUDIO ALERTS IN A HEARING DEVICE

(71) Applicant: Voyetra Turtle Beach, Inc., White Plains, NY (US)

(72) Inventors: Richard Kulavik, San Jose, CA (US); Michael A. Jessup, San Jose, CA (US); Kevin Arthur Robertson, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/546,130

(22) Filed: Dec. 9, 2021

(65) Prior Publication Data

US 2022/0103956 A1 Mar. 31, 2022

Related U.S. Application Data

(63) Continuation of application No. 16/842,413, filed on Apr. 7, 2020, now Pat. No. 11,412,335, which is a (Continued)

(51) Int. Cl.

*H04R 29/00* (2006.01)

*H04R 1/10* (2006.01)

(52) U.S. Cl.

CPC ............... *H04R 29/00* (2013.01); *H04R 1/10* (2013.01); *H04R 2420/09* (2013.01)

(58) Field of Classification Search

CPC .. H04S 2420/01; H04S 2400/11; H04S 1/007; H04S 2400/01; H04S 7/304;

(Continued)

(56) References Cited

U.S. PATENT DOCUMENTS

| | | | | |
|---|---|---|---|---|
| 5,245,317 A * | 9/1993 | Chidley | | G08B 21/0288 367/93 |
| 6,053,814 A | 4/2000 | Pchenitchnikov | | |

(Continued)

FOREIGN PATENT DOCUMENTS

| | | |
|---|---|---|
| WO | 2012172480 | 12/2012 |

OTHER PUBLICATIONS

International Search Report and Written Opinion for PCT/US14/54060 dated Dec. 18, 2014.

(Continued)

*Primary Examiner* — Lun-See Lao

(74) *Attorney, Agent, or Firm* — McAndrews, Held & Malloy, Ltd.

(57) ABSTRACT

A game headset receives a game audio during play of a particular game, monitors the game audio and detects an occurrence of one or more particular sounds in the game audio during the monitoring of the one or more of the plurality of audio channels. In response to the detecting, the game headset triggers playback of one or more of a plurality of voice commands that corresponds to the one or more particular sounds. The voice commands may be predefined and associated with the one or more particular sounds in a data structure. The voice commands may instruct the listener of the game headset to perform an action in the particular game. The characteristics of the one or more sounds may include direction, intensity, and/or frequency of the particular one or more sounds.

20 Claims, 12 Drawing Sheets

Related U.S. Application Data continuation of application No. 16/110,606, filed on Aug. 23, 2018, now Pat. No. 10,616,700, which is a continuation of application No. 14/465,408, filed on Aug. 21, 2014, now Pat. No. 10,063,982.

(60) Provisional application No. 61/888,685, filed on Oct. 9, 2013.

(58) Field of Classification Search

CPC . H04S 7/303; H04S 7/30; H04S 7/302; H04S 2400/15; H04S 7/40; H04S 1/005; H04S 2400/13; H04S 2420/13; H04S 3/00; H04S 5/02; H04R 5/033; H04R 5/04; H04R 2499/11; H04R 29/00; H04R 2430/03; H04R 3/04; H04R 1/10; H04R 2420/09; H04R 2400/01; H04R 2499/13; H04R 25/353; H04R 29/001; H04R 3/12; H04M 1/6033; H04M 1/0202; H04M 2201/40; G10L 15/04; G10L 25/81; G10L 21/14; H04W 88/02; G10K 15/12; H03G 5/025; H04L 67/306; H04N 2213/001; H04N 23/51; H04N 23/661; H04N 13/20; H04N 13/239; H04N 13/243; H04N 21/21805; H04N 21/2187; H04N 21/41415; H04N 21/6106; H04N 21/6125; H04N 21/6131; H04N 23/00; H04N 23/55; H04N 23/57; H04N 23/611; H04N 23/681; H04N 23/695; H04N 23/698; H04N 23/90; H04N 5/222; H04N 7/181; H04N 5/76; H04N 9/8045

USPC .......................................... 381/56–58; 700/94

See application file for complete search history.

(56) References Cited

U.S. PATENT DOCUMENTS

| | | | | |
|---|---|---|---|---|
| 6,614,912 | B1 | 9/2003 | Yamada et al. | |
| 6,905,414 | B2 * | 6/2005 | Danieli | A63F 13/87 463/2 |
| 7,136,712 | B2 | 11/2006 | Mizumura et al. | |
| 7,403,600 | B2 * | 7/2008 | Koch | H04M 19/041 379/215.01 |
| 7,976,385 | B2 | 7/2011 | Riggs | |
| 8,979,658 | B1 | 3/2015 | Kulavik | |
| 9,067,135 | B2 | 6/2015 | Kulavik | |
| 9,420,079 | B2 * | 8/2016 | Mears | H04M 1/576 |
| 10,063,982 | B2 | 8/2018 | Kulavik et al. | |
| 10,616,700 | B2 | 4/2020 | Kulavik et al. | |
| 11,412,335 | B2 * | 8/2022 | Kulavik | H04R 1/10 |
| 2002/0094865 | A1 | 7/2002 | Araki et al. | |
| 2002/0161586 | A1 | 10/2002 | Wang | |
| 2003/0007648 | A1 | 1/2003 | Currell | |
| 2004/0136538 | A1 | 7/2004 | Cohen et al. | |
| 2004/0255336 | A1 * | 12/2004 | Logan | H04N 21/4663 725/38 |
| 2005/0117761 | A1 | 6/2005 | Sato | |
| 2006/0120533 | A1 | 6/2006 | Chen | |
| 2007/0218966 | A1 | 9/2007 | Tilston | |
| 2008/0009332 | A1 | 1/2008 | Kake | |
| 2008/0240458 | A1 | 10/2008 | Goldstein et al. | |
| 2008/0318518 | A1 | 12/2008 | Coutinho et al. | |
| 2008/0318673 | A1 * | 12/2008 | Rofougaran | A63F 13/573 463/29 |
| 2009/0147975 | A1 | 6/2009 | Horback et al. | |
| 2009/0232317 | A1 | 9/2009 | Emeri et al. | |
| 2009/0252337 | A1 | 10/2009 | Chen et al. | |
| 2009/0252355 | A1 | 10/2009 | Mao | |
| 2009/0286514 | A1 * | 11/2009 | Lichorowic | H04M 3/4938 455/412.2 |
| 2009/0304214 | A1 | 12/2009 | Xiang et al. | |
| 2010/0040240 | A1 | 2/2010 | Bonanno | |
| 2011/0002471 | A1 * | 1/2011 | Wihardja | H04R 3/007 381/98 |
| 2011/0135098 | A1 | 6/2011 | Kuhr et al. | |
| 2012/0014553 | A1 | 1/2012 | Bonanno | |
| 2012/0213375 | A1 | 8/2012 | Mahabub et al. | |
| 2013/0041648 | A1 * | 2/2013 | Osman | H04S 7/302 381/300 |
| 2014/0073429 | A1 | 3/2014 | Meneses et al. | |
| 2014/0133683 | A1 | 5/2014 | Robinson et al. | |
| 2014/0372892 | A1 * | 12/2014 | Payzer | G10L 15/22 715/728 |
| 2015/0098597 | A1 | 4/2015 | Kulavik | |
| 2015/0098603 | A1 | 4/2015 | Kulavik et al. | |
| 2015/0235645 | A1 * | 8/2015 | Hooks | G10L 19/008 704/500 |
| 2017/0136355 | A1 * | 5/2017 | Rajapakse | A63F 13/493 |

OTHER PUBLICATIONS

International Search Report and Written Opinion for PCT/US2014/049687 dated Nov. 18, 2014.

International Search Report and Written Opinion for PCT/US2014/059691 dated Jan. 7, 2015.

* cited by examiner

AUDIO ALERTS IN A HEARING DEVICE

PRIORITY CLAIM

This application is a continuation of U.S. application Ser. No. 16/842,413 filed on Apr. 7, 2020, which is a continuation of U.S. application Ser. No. 16/110,606 filed on Aug. 23, 2018, now U.S. Pat. No. 10,616,700, which is a continuation of U.S. application Ser. No. 14/465,408, filed on Aug. 21, 2014, now U.S. Pat. No. 10,063,982, which claims the benefit of priority to U.S. provisional patent application 61/888,685. The aforementioned documents are hereby incorporated herein by reference in their entirety.

TECHNICAL FIELD

Aspects of the present application relate to electronic gaming. More specifically, to methods and systems for a game headset with audio alerts based on audio track analysis.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for a game headset with audio alerts based on audio track analysis, substantially as illustrated by and/or described in connection with at least one of the figures, as set forth more completely in the claims.

DETAILED DESCRIPTION

Certain embodiments of the disclosure may be found in a method and system for a game headset with audio alerts based on audio track analysis. In accordance with various embodiments of the disclosure, a game headset is operable to receive a plurality of audio channels during play of a particular game. The game headset may monitors one or more of the plurality of audio channels and may detect an occurrence of one or more particular sounds in the plurality of audio channels during the monitoring of the one or more of the plurality of audio channels. In response to the detecting, the game headset may trigger playback of one or more of a plurality of voice commands that corresponds to the one or more particular sounds. The voice commands may be predefined and associated with the one or more particular sounds in a data structure. The voice commands may instruct the listener of the game headset to perform an action in the particular game. The characteristics of the one or more sounds may include direction, intensity, and/or frequency of the particular one or more sounds. The particular sounds may be part of an audio track of the game and/or are inserted in the audio signals specifically to convey information to the game headset and/or cause the triggering of the playback of the one or more of the plurality of voice commands. Signal analysis may be performed on the audio channels during the play of the particular game in order to detect the characteristics of the sounds. Results of the signal analysis on the corresponding plurality of audio signals may be compared with corresponding stored audio information for the particular game. The stored audio information for the particular game may be acquired from a storage device that is either internal to the game headset or external to the game headset.

Figure 1A:
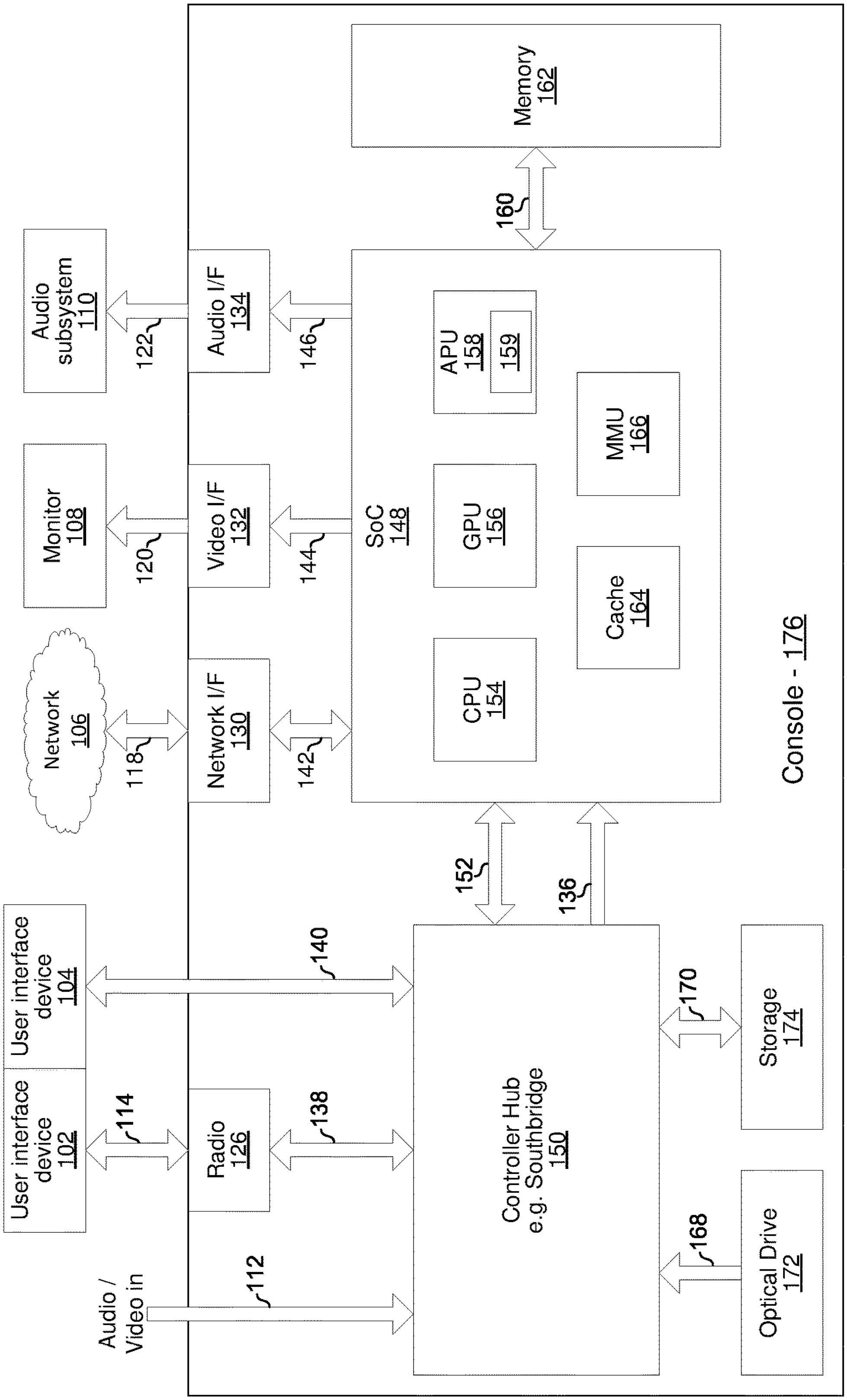
FIG. 1A is a diagram that depicts an example gaming console, which may be utilized to communicate with a game headset with audio alerts based on audio track analysis, in accordance with various exemplary embodiments of the disclosure.

FIG. 1A depicts an example gaming console, which may be utilized to communicate with a game headset with audio alerts, in accordance with various exemplary embodiment of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 136, 138, 142, 144, 146, 152, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the console and/or part of one or more software applications running on the console.

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuit. The game console 176 sends audio to the audio subsystem 110 via link(s) 122 (e.g., S/PDIF for digital audio or "line out" for analog audio). Additional details of an example audio subsystem 110 are described below.

Figure 1B:
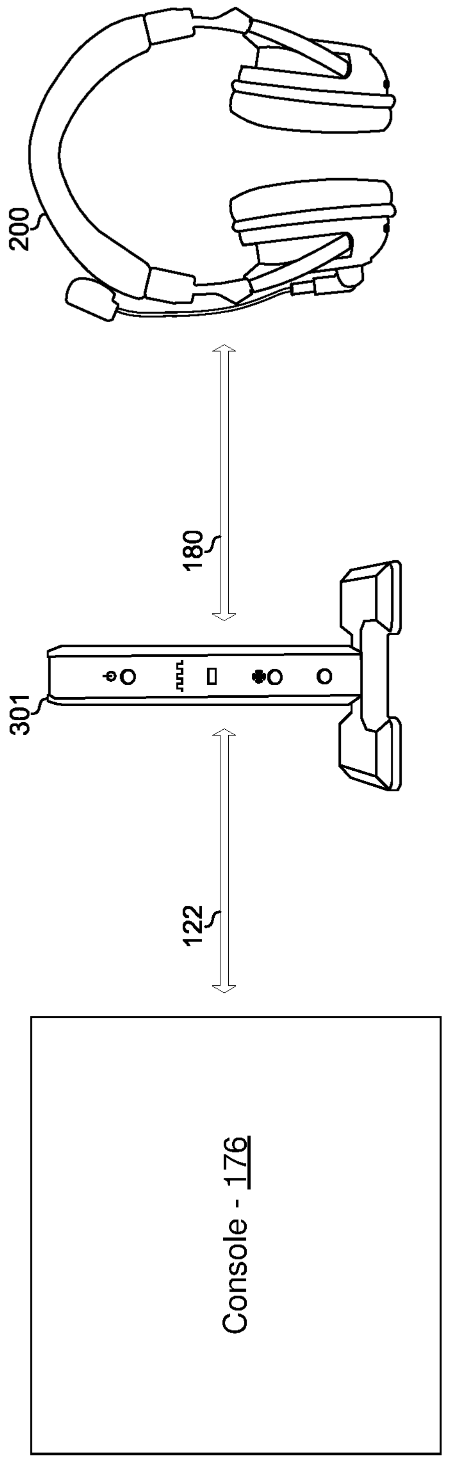
FIG. 1B is a diagram that depicts an example gaming audio subsystem comprising a headset and an audio basestation, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

Figure 1C:
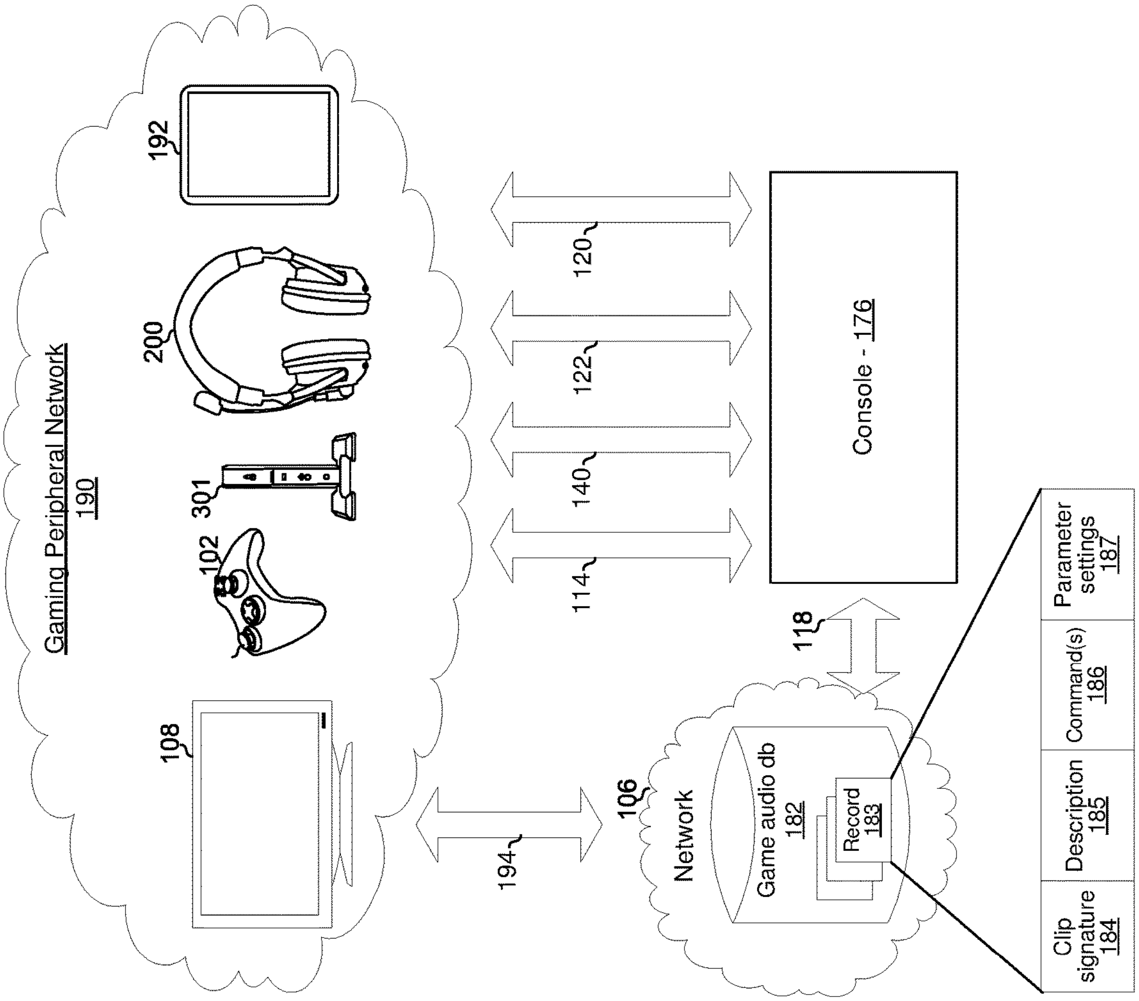
FIG. 1C is a diagram of an exemplary gaming console and an associated network of peripheral devices, in accordance with various exemplary embodiments of the disclosure.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprint") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
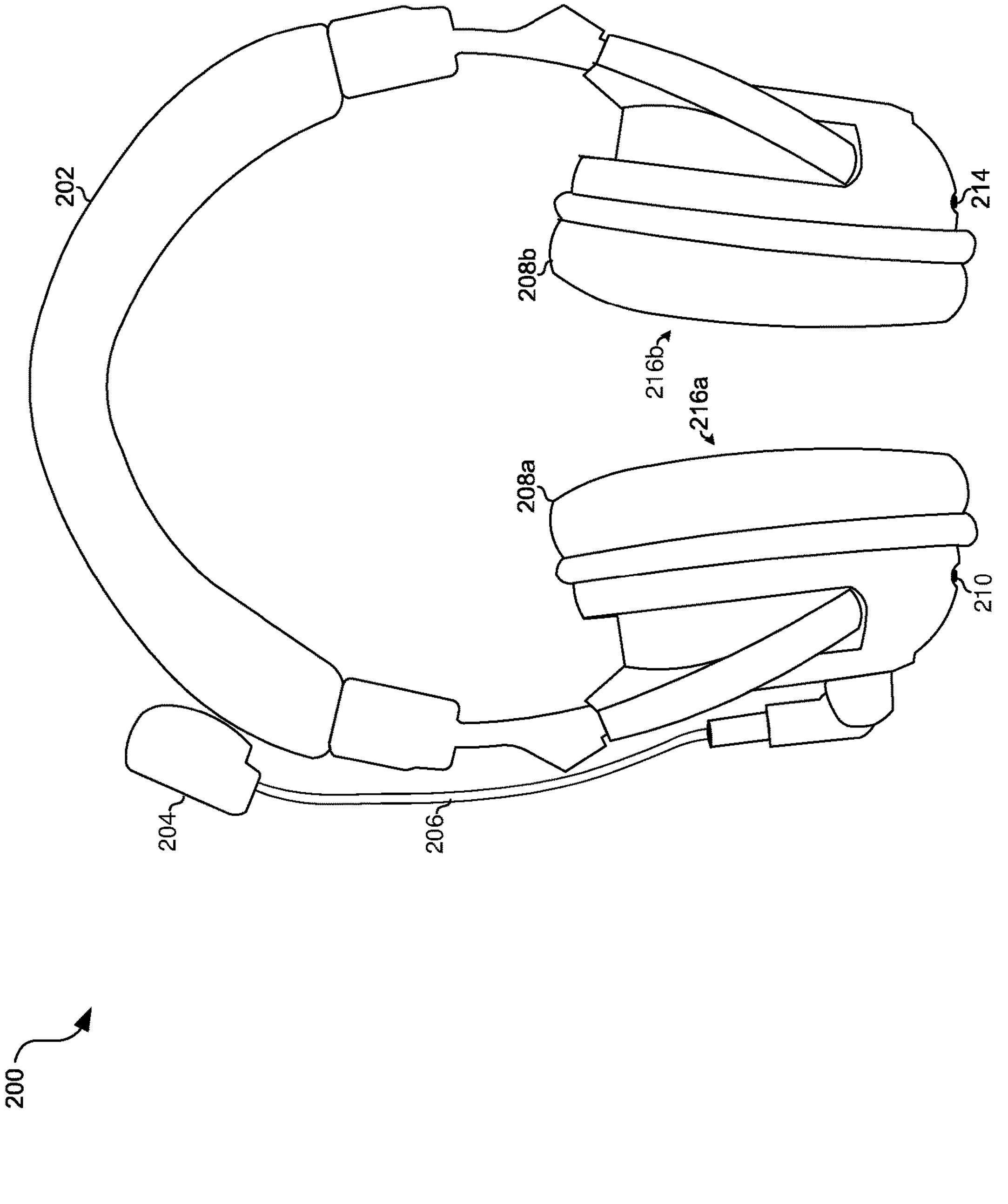
FIGS. 2A and 2B are diagrams that depict two views of an example embodiment of a game headset, in accordance with various exemplary embodiments of the disclosure.
Figure 2B:
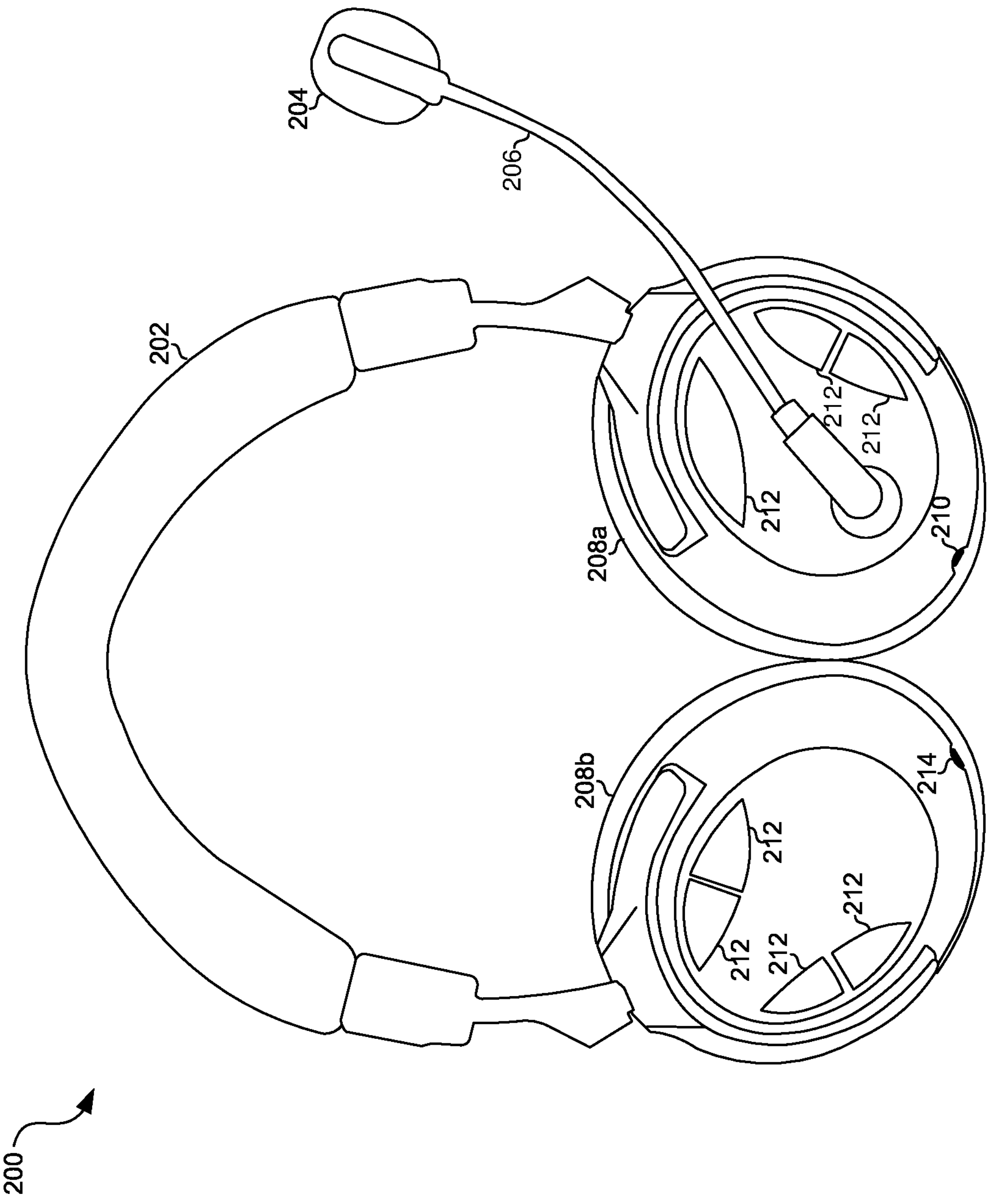

FIGS. 2A and 2B are diagrams that depict two views of an example embodiment of a game headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups **208*a* and 208*b* which surround speakers 216*a* and 216*b*, connector 210, connector 214, and user controls 212**.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers **216*a* and 216*b*** may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuit of the headset 200, control gain/volume of, and/or effects applied to, game audio by the audio processing circuit of the headset 200, enable/disable/initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engage in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
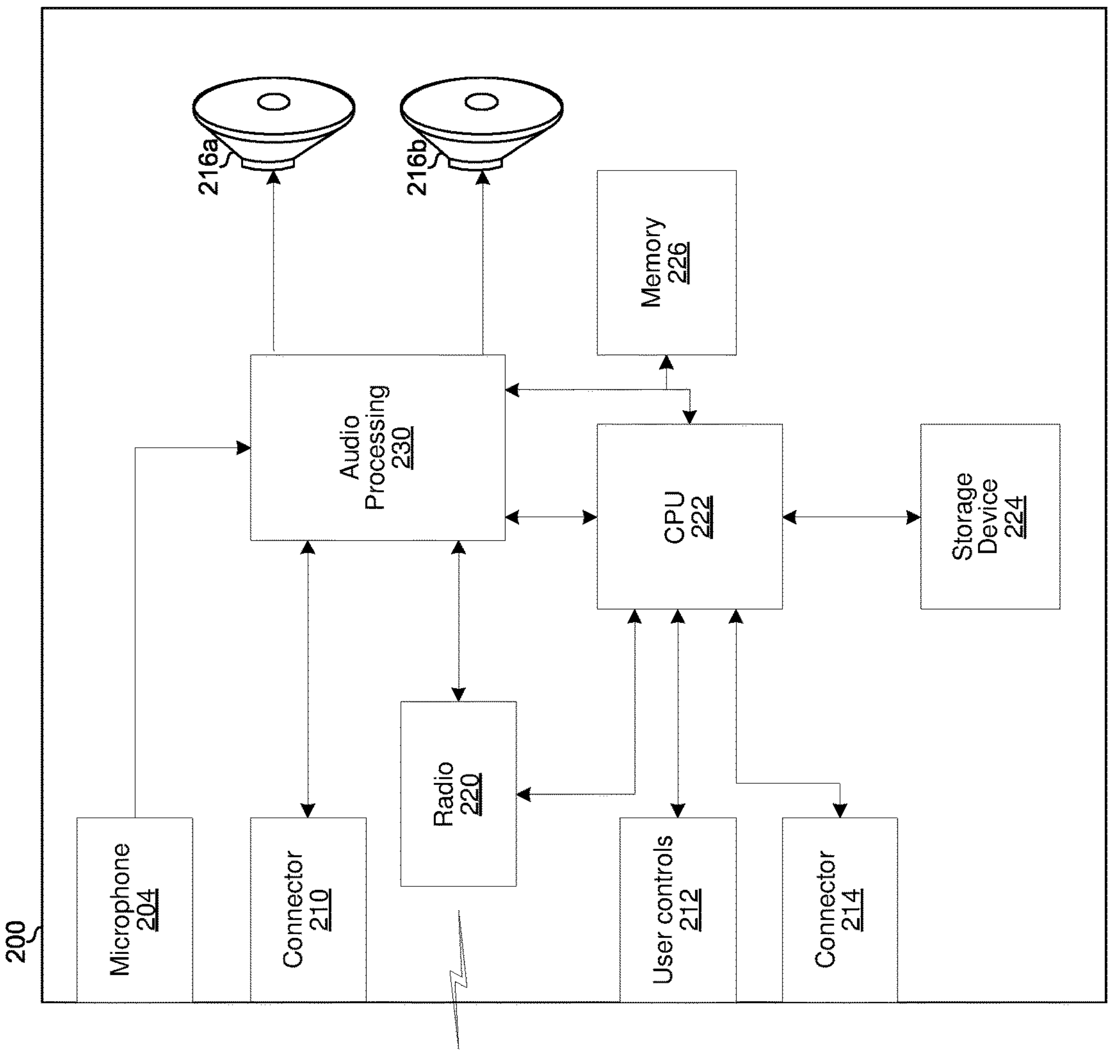
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers **216*a* and 216*b* already discussed, shown are a radio 220, a CPU 222, a storage device 224, a memory 226, and an audio processing circuit 230**.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle processing of audio alerts for the headset 200 based on, for example, analysis of game and/or chat audio received from the console 176 during game play. The CPU 222 may also be operable to handle processing of audio alerts for the headset 200 based on, for example, information in game and/or chat audio that is present specifically for the purpose of trigging audio alerts in the headset 200, rather than for the purpose of presentation to a listener. In this regard, the CPU 222 may be operable to dynamically handle processing of the audio alerts for the headset 200 based on information that may be received from the audio processing circuit 230 and/or information that may be stored in the storage device 224 or an external storage device.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store audio information resulting from analysis of the plurality of audio channels of game and/or chat audio during game play. In one embodiment of the disclosure, the headset 200 may be operable to download the audio information for a particular game from a sounds database in an external storage device and store the downloaded audio information in the storage device 224. The external storage device may be located at a remote server (e.g., database 182 in FIG. 1C) or may be an external memory device, for example. In this regard, the CPU 222 may be operable to configure the radio 220 to download the audio information for the particular game. The audio information may comprise sounds and/or corresponding voice commands for the particular game. Upon subsequent playback of that particular game, the headset 200 does not need to download the audio information for that particular game from the sounds database but may instead acquire the audio information for that particular game from the storage 224. The CPU 222 may be operable to ensure that any updates to the sounds database may be downloaded from the sounds database and saved in the storage device 224 to ensure that the audio information for the particular game is kept up-to-date.

In another embodiment of the disclosure, the CPU 222 may be operable to configure the audio processing circuit 230 to perform signal analysis on the plurality of audio channels that are received via the connector 210 and/or the radio 220. The CPU 222 may be enabled to control the operation of the audio processing circuit 230 in order to store the results of the audio analysis along with, for example, an identifier of the game in the storage device 224. The CPU 222 may be enabled to monitor the plurality of audio channels that are received via the connector 210 and detect the characteristics of one or more sounds. Based on the detected sounds, the CPU 222 may be operable to trigger the playback of one or more voice commands (or tones or other sounds) that corresponds to the detected sounds. The CPU 222 may be operable to extract the one or more voice commands that correspond to the detected sounds from the internal storage device 504*b*.

In an exemplary embodiment of the disclosure, audio information for a particular game may be stored in a lookup table (LUT) in the storage device 224. In this regard, the LUT may comprise an identity of the game, audio information corresponding to a detected sound and a corresponding voice command (or tone or other sound) that is mapped to the detected sounds. In instances when a sound is detected on a monitored channel, the CPU 222 may compare the detected sound to that audio information that is stored in the storage device 224. If the comparison results in a match between the detected sound and the stored audio information, the corresponding voice command may be may be extracted from the LUT and played back.

The memory 226 may comprise suitable logic, circuitry, interfaces and/or code that may comprise volatile memory used by the CPU 222 and/or audio processing circuit 230 as program memory, for storing runtime data, and so on. In this regard, the memory 226 may comprise information and/or data that may be utilized to control operation of the audio processing circuit 230 to perform signal analysis on the plurality of received audio channels in order to detect the characteristics of one or more sounds.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216*a* and 216*b*. Additionally, or alternatively, the processing may be performed on chat audio that is subsequently output to the connector 210 and/or radio 220.

The audio processing circuit 230 may be operable to perform signal analysis on received audio signals that carry a plurality of audio channels. In this regard, the audio processing circuit 230 may be operable to analyze the audio on each of the plurality of received audio channels in order to detect the characteristics of sounds corresponding to the audio signals. In an exemplary embodiment of the disclosure, the audio processing circuit 230 may be operable to analyze the audio on each of the plurality of received audio channels in order to detect a unique signature that may be associated with a certain sound. Based on the signal analysis by the audio processing circuit 230, the CPU 222 may determine whether a sound detected on one of the plurality of received audio channels for a game may trigger the playback of one or more voice commands. In this regard, the CPU 222 may compare the detected sound (or a signature or "acoustic fingerprint" of the detected sound) to that audio information that is stored in the storage device 224 (e.g., signatures or acoustic fingerprints of known sounds stored in the storage device 224). If the comparison results in a match between the detected sound and the stored audio information, the CPU 222 may extract the corresponding voice command from the LUT and cause the play back of the voice command.

In an exemplary embodiment of the disclosure, the audio processing circuit 230 may be operable to detect sounds in the game and/or chat audio whose purpose is to trigger the play back of a corresponding voice command (as opposed to sounds whose purpose is to be heard by a listener). In this regard, whenever the audio processing circuit 230 detects a particular such sound, the audio processing circuit 230 may notify the CPU 222 that the particular embedded sound has been detected. The CPU 222 may then determine the corresponding voice command from the information stored in the LUT and cause play back of the corresponding voice command. A sound specifically having the purpose of triggering action by the headset 200 may be, for example, a tone or sequence of tones near an extreme of the audio band such that they are nearly, or entirely, imperceptible by the listener. The sounds may be part of the game's audio track (e.g., put there by the game makers/designers), inserted by the console 176 as it is processing the game and/or chat audio for output to the headset 200, inserted by a server hosting the multiplayer chat, inserted by the headset of another player as it processes microphone audio for output to a corresponding console, and/or inserted by the console of another player as it is processing microphone audio for output to the chat server.

In an exemplary embodiment of the disclosure, the audio processing circuit 230 may be operable to detect sounds in the game and/or chat audio whose purpose is to convey information (e.g., identify the game currently being played, identify a particular scenario currently taking place in the game, etc.) to the audio headset 200 (as opposed to sounds whose purpose is to be heard by a listener).

Figure 3A:
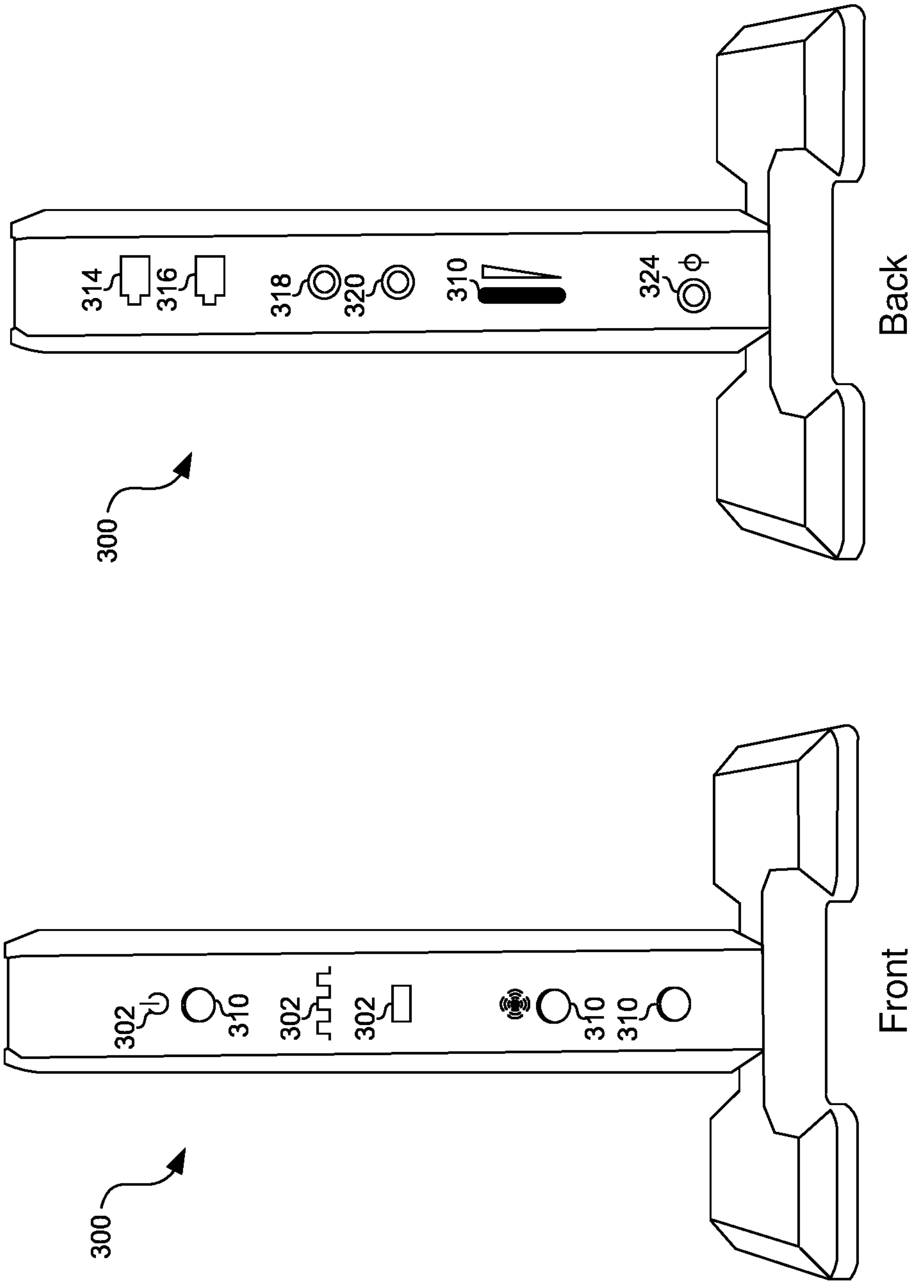
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
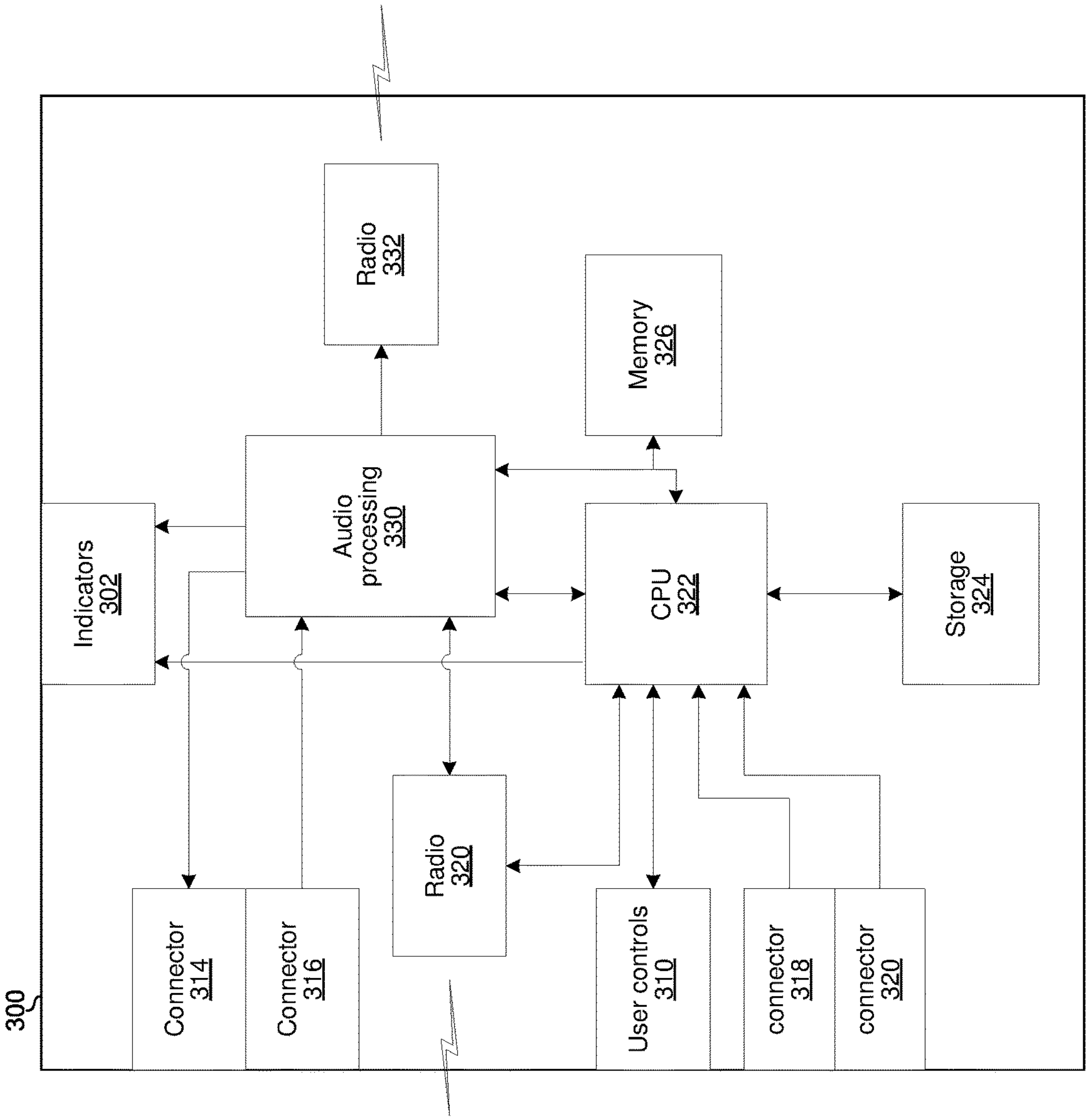
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
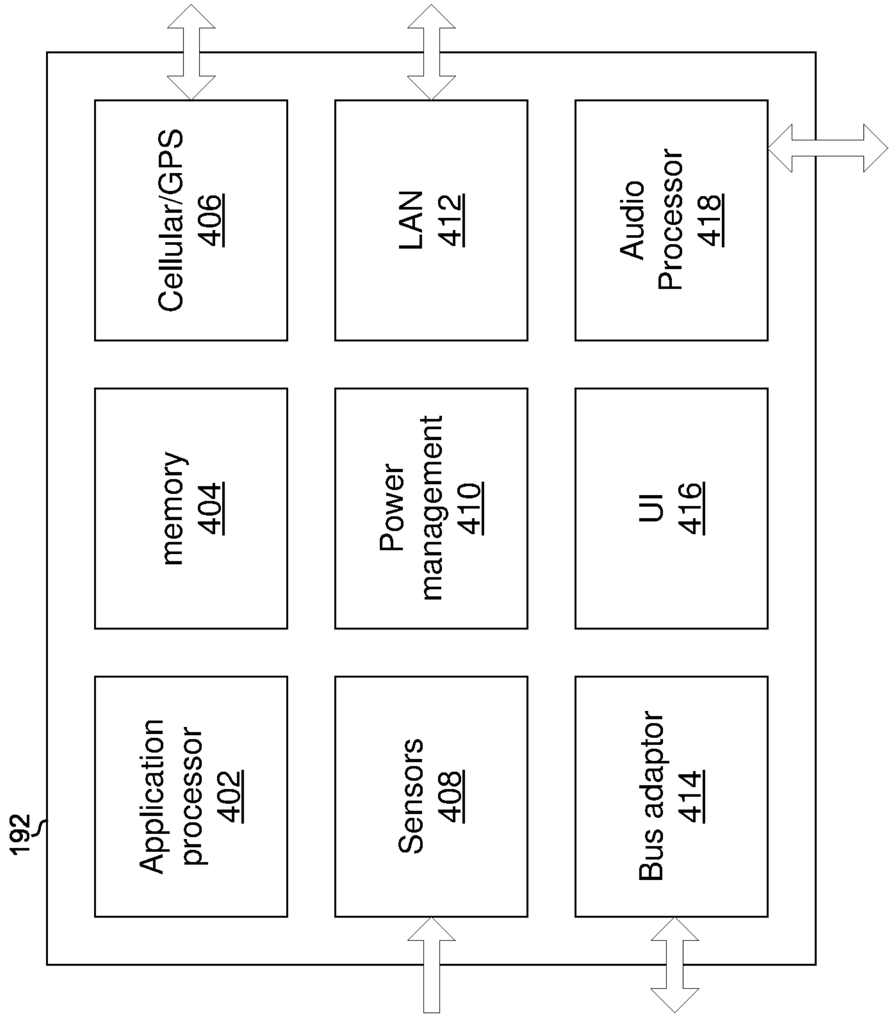
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
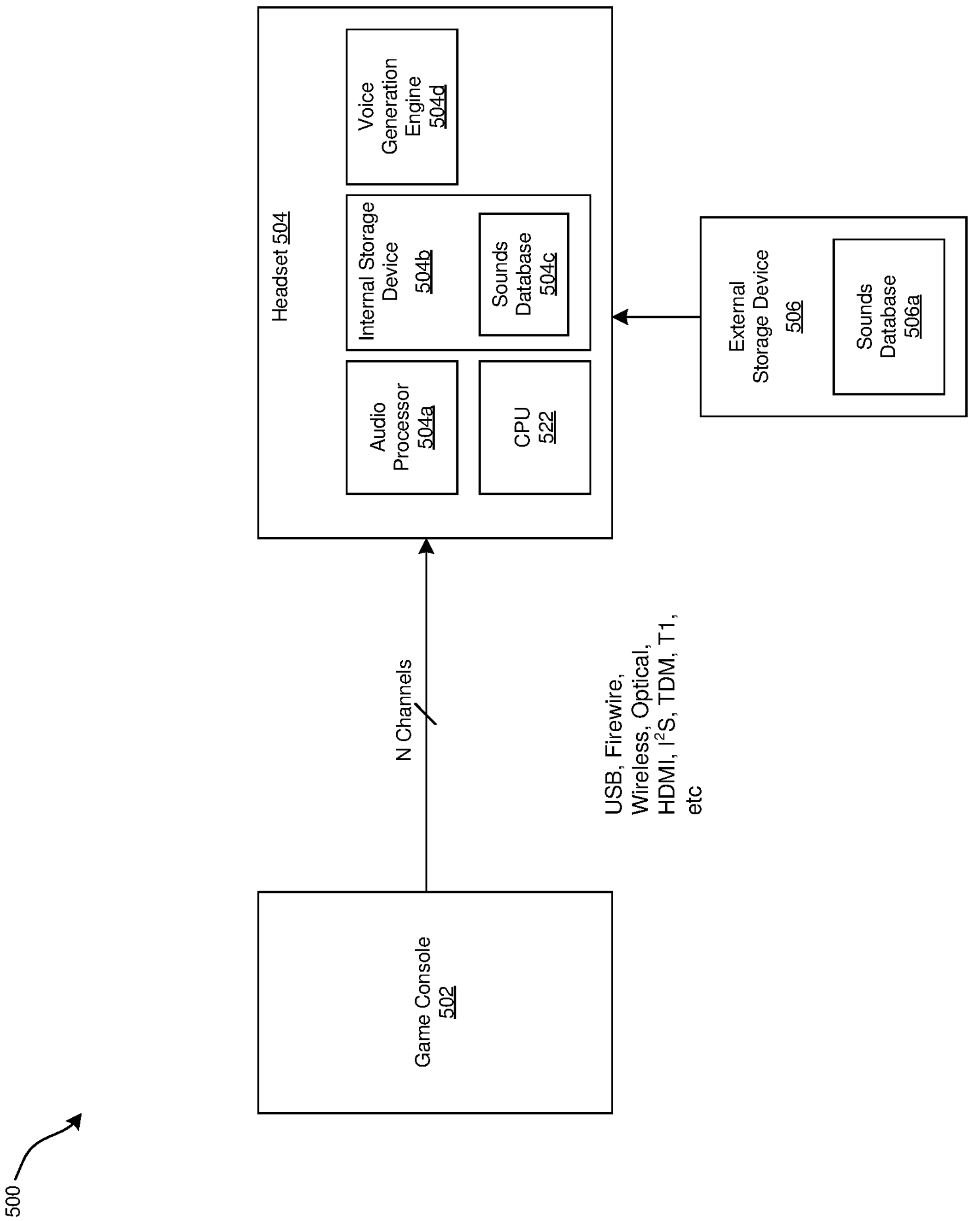
FIG. 5 is a block diagram illustrating an exemplary subsystem that may be utilized for providing audio alerts based on sounds detected during game play, in accordance with an embodiment of the disclosure

FIG. 5 is a block diagram illustrating an exemplary subsystem that may be utilized for providing audio alerts based on sounds detected during game play, in accordance with an embodiment of the disclosure. Referring to FIG. 5, there is shown a game console 502, a headset 504, and an external storage device 506. The headset 504 may comprise an audio processor **504*a*, an internal storage device 504*b*, a voice generation engine 504*d* and a CPU 522. The internal storage device 504*b* may comprise a sounds database 504*c*. The external storage device 506 may comprise a sounds database 506*a***.

The game console 502 may comprise suitable logic, circuitry, interfaces and/or code that may be operable to present a game to, and also enable game play interaction between, one or more local players and/or one or more remote players. The game console 502 may be substantially similar to the game console 176, which is shown and described with respect to FIG. 1A. The game console 502 may be operable to generate output video signals for a game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel.

The headset 504 may comprise suitable logic, circuitry, interfaces and/or code that may be operable to receive the plurality of audio channels of game and/or chat audio. The headset 504 may be substantially similar to the headset 200, which is shown and described with respect to FIGS. 2A, 2B and 2C. The headset 504 may be operable to monitor the audio channels in order to detect characteristics of the sounds on the monitored audio channels.

The external storage device 506 may comprise one or more suitable devices having suitable logic, circuitry, interfaces and/or code that may be operable to store audio information for a game. The audio information may be stored in, for example, the sounds database **506*a***.

The audio processor **504*a* may comprise suitable logic, circuitry, interfaces and/or code that may be operable to monitor the plurality of audio channels of the game and/or chat audio. The audio processor 504*a* may be substantially similar to the audio processing circuit 230, which is shown and described with respect to FIG. 1A. The audio processor 504*a* may be operable to utilize signal analysis to detect the characteristics of sounds in the monitored plurality of audio channels. In instances when the audio processor 504*a* detects certain sounds, the audio processor 504*a* may be operable to trigger an event that causes a corresponding voice command to be played by the voice generation engine 504*d***.

The internal storage device **504*b* may comprise one or more suitable devices that may comprise suitable logic, circuitry, interfaces and/or code that may be operable to store audio information for a game. The internal storage device 504***b* may be substantially similar to the storage device 224, which is shown and described with respect to FIG. 2C. The audio information may be stored in, for example, the sounds database 504*c*. Audio information for a particular game may be downloaded from the sounds database 506*a*, which is in the external storage device 506, by the headset 504 via, for example, a wireless connection. The downloaded audio information may be stored in the sounds database 504*c*, which is in the internal storage device 504*b*. Audio information may be retrieved from the internal storage device 504*b* when a game is initiated.

The CPU 522 may comprise suitable logic, circuitry, interfaces and/or code that may be operable to execute instructions for controlling, managing and/or coordinating the overall operation of the headset 504. In this regard, the CPU 222 may be operable to control, manage and coordinate operation of the components in the headset 504, which comprises the audio processor 504*a*, the internal storage device 504*b*, the voice generation engine 504*d*, and the sounds database 504*c*. The CPU 522 may also be operable to coordinate and manage operations between the headset 504, the game console 502, and the external storage device 506*d*. The CPU 522 may also be operable to coordinate and manage operations for the sounds database 504*c* and the sounds database 506*a*. The CPU 522 may be substantially similar to the CPU 222, which is shown and described with respect to, for example, FIG. 2C.

The voice generation engine 504*d* may comprise suitable logic, circuitry, interfaces and/or code that may be operable to generate a voice command corresponding to a particular sound that may be detected within the monitored channels by the audio processor 504*a*. The voice command may also be referred to as a voice prompt. The voice command or voice prompt may comprise a predefined or preset phrase that may be played when the audio processor 504*a* detects a particular sound within the monitored channels. In accordance with an embodiment of the disclosure, the voice commands may be directional. For example, if the audio processor 504*a* detects sounds whose characteristics indicate that the audio is increasing in the SR channel and/or RR channel, the headset 504 may be operable to generate a voice command that states "Look to your right.!" In another example, in instances when the audio processor 504*a* detects sounds in both the RR channel and the RL channel, the CPU 522 may be operable to cause the voice generation engine 504*d* to generate a voice command that states "He's behind you!"

In some embodiments of the disclosure, the CPU 522 may be operable to cause the voice generation engine 504*d* to play or otherwise generate a voice command in instances when the audio processor 504*a* detects a particular sound or sounds that are part of a game's audio track and are intended to be heard by the listener. In an exemplary embodiment of the disclosure, in instances when the audio processor 504*a* is monitoring the audio signals on one or more of the plurality of audio channels and detects the sound of a red-lining engine during game play, the CPU 522 may be operable to cause the voice generation engine 504*d* to generate a voice command that states "Shift!."

In operation, the audio processing circuit 504*a* may be operable to monitor the plurality of received audio channels from the game console 502. In this regard, the audio processing circuit 504*a* may be operable to perform signal analysis on each of the plurality of received audio channels to detect the characteristics of sounds carried in one or more of the audio channels. Based on the signal analysis by the audio processing circuit 504*a*, the CPU 522 may be operable to determine whether a sound that is detected on one or more of the plurality of received audio channels for the game should trigger the generation and/or playback of one or more voice commands by the voice generation engine 504*d*. In this regard, the CPU 522 may compare the detected sound to audio information that is stored in the internal storage device 504*b*. If the comparison results in a match between the detected sound and the stored audio information, the CPU 522 may extract the corresponding voice command from the LUT, which may be stored in the sounds database 504*c*, and cause the play back of the corresponding voice command.

Figure 6:
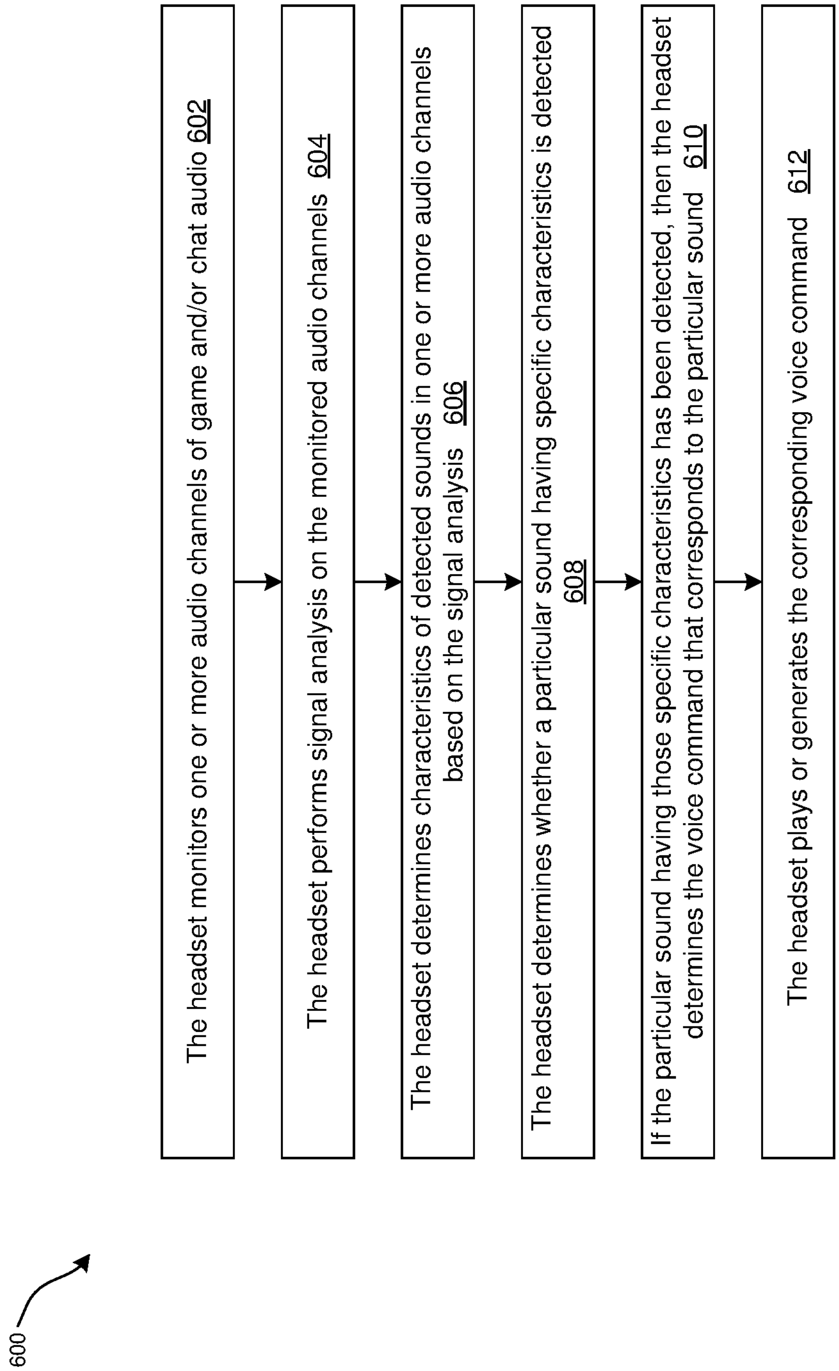
FIG. 6 is a flow diagram illustrating exemplary steps for generating audio alerts in a headset, in accordance with various exemplary embodiments of the disclosure.

FIG. 6 is a flow diagram illustrating exemplary steps for generating audio alerts in a headset, in accordance with various exemplary embodiments of the disclosure. Referring to FIG. 6, there is shown a flow chart 600 comprising a plurality of exemplary steps, namely, 602 through 612. In step 602, the headset 504 may be operable to monitor one or more audio channels of game and/or chat audio. In step 604, the headset 504 may be operable to perform signal analysis on the monitored audio channels. In step 606, the headset 504 may be operable to determine characteristics of detected sounds on the one or more audio channels based on the signal analysis. In step 608, the headset 504 may be operable to determine whether a particular sound having specific characteristics is detected. In step 610, if the particular sound having those specific characteristics has been detected, then the headset 504 may be operable to determine the voice command that corresponds to the particular sound. In step 612, the headset 504 may be operable to play or generate the determined voice command.

Figure 7:
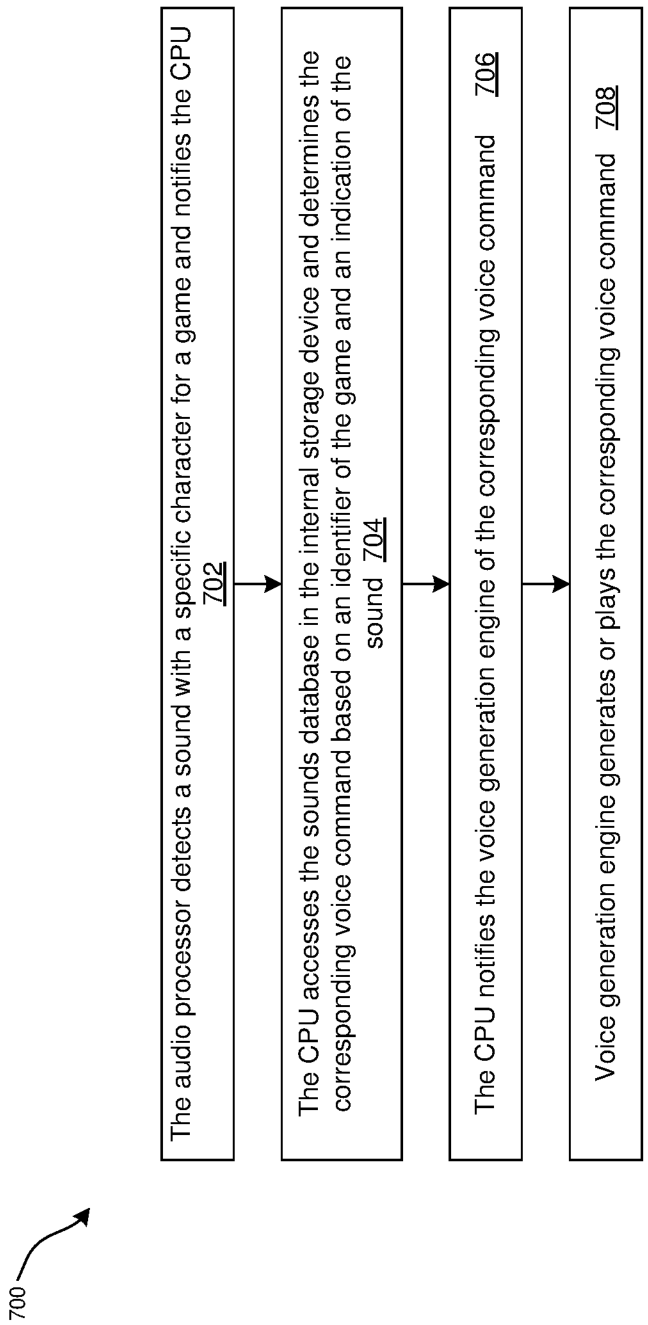
FIG. 7 is a flow diagram illustrating exemplary steps for generating audio alerts in a headset, in accordance with various exemplary embodiments of the disclosure.

FIG. 7 is a flow diagram illustrating exemplary steps for generating audio alerts in a headset, in accordance with various exemplary embodiments of the disclosure. Referring to FIG. 7, there is shown a flow chart 700 comprising a plurality of exemplary steps, namely, 702 through 708. In step 702, the audio processor 504*a* detects a sound with a specific character for a game and notifies the CPU 522. In step 704, the CPU 522 accesses the sounds database 504*c* in the internal storage device 504*b* and determines the corresponding voice command based on an identifier of the game and an indication of the sound. In step 706, the CPU 522 notifies the voice generation engine 504*d* of the corresponding voice command. In step 708, the voice generation engine 504*d* generates or plays the corresponding voice command.

In accordance with en exemplary embodiment of the disclosure, a game headset such as the headset 200 may be operable to receive a plurality of audio channels during play of a particular game. The game headset 200 may be operable to monitor one or more of the plurality of audio channels and detect an occurrence of one or more particular sounds in the plurality of audio channels during the monitoring of the one or more of the plurality of audio channels. In response to detecting the one or more particular sounds, the game headset 200 may be operable to trigger playback of one or more of a plurality of voice commands that corresponds to the one or more particular sounds. The one or more of the plurality of voice commands may be predefined, may be associated with the one or more particular sounds in a data structure, and/or may instruct the listener of the game headset 200 to perform an action in the particular game.

The characteristics of the one or more sounds may comprise direction, intensity, and/or frequency of the particular one or more sounds. The one or more particular sounds may be part of an audio track of the game. The one or more particular sounds may be inserted in the plurality of audio signals specifically to convey information to the game headset. The one or more particular sounds may be inserted in the plurality of audio signals specifically to cause the triggering of the playback of the one or more of the plurality of voice commands.

The game headset 200 may be operable to perform signal analysis on the plurality of audio channels during the play of the particular game in order to detect the characteristics of the one or more sounds. The game headset 200 may be operable to compare results of the signal analysis on the corresponding plurality of audio signals with corresponding stored audio information for the particular game. The game headset 200 may be operable to acquire the stored audio information for the particular game from a storage device that is either internal to the game headset or external to the game headset.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:

in a hearing device:

while receiving an audio signal, detecting one or more sounds that are beyond a hearing range of a user of the hearing device, wherein the detecting comprises detecting characteristics of the one or more sounds; and in response to the detecting of the one or more sounds, triggering a playback of one or more audio alerts that are within the hearing range of the user of the hearing device.

2. The method according to claim 1, wherein:

the audio signal is generated by a video game.

3. The method according to claim 1, wherein:

the one or more sounds are inserted in the audio signal to convey information to the user of the hearing device.

4. The method according to claim 1, wherein:

the audio signal comprises a plurality of audio channels.

5. The method according to claim 1, wherein:

the characteristics of the one or more sounds comprises direction, intensity, and/or frequency of the one or more sounds.

6. The method according to claim 1, wherein:

the detecting comprises comparing the audio signal with stored audio information.

7. The method according to claim 6, wherein:

the stored audio information is associated with a video game.

8. The method according to claim 7, wherein the method comprises:

acquiring the stored audio information from an external device.

9. The method according to claim 1, wherein:

the one or more audio alerts comprise a voice command.

10. The method according to claim 9, wherein:

the voice command instructs the user of the hearing device to perform an action.

11. A system, comprising:

a hearing device configured to trigger a playback of one or more audio alerts in response to a detection of one or more sounds within an audio signal, wherein:

the detection comprises a detection of characteristics of the one or more sounds, the detection occurs while the audio signal is received, the one or more sounds are beyond a hearing range of a user of the hearing device, and the or more audio alerts are within the hearing range of the user of the hearing device.

12. The system according to claim 11, wherein:

the audio signal is generated by a video game.

13. The system according to claim 11, wherein:
the one or more sounds are inserted in the audio signal to convey information to the user of the hearing device.

14. The system according to claim 11, wherein:
the audio signal comprises a plurality of audio channels.

15. The system according to claim 11, wherein:
the characteristics of the one or more sounds comprises direction, intensity, and/or frequency of the one or more sounds.

16. The system according to claim 11, wherein:
the detection comprises a comparison of the audio signal with stored audio information.

17. The system according to claim 16, wherein:
the stored audio information is associated with a video game.

18. The system according to claim 17, wherein:
the hearing device is configured to acquire the stored audio information from an external device.

19. The system according to claim 11, wherein:
the one or more audio alerts comprise a voice command.

20. The system according to claim 19, wherein:
the voice command instructs the user of the hearing device to perform an action.

* * * * *